US012236311B2

United States Patent
Kolb et al.

(10) Patent No.: US 12,236,311 B2
(45) Date of Patent: Feb. 25, 2025

(54) DEVICE FOR SCANNING DATA MATRIX CODES

(71) Applicant: Oerlikon Surface Solutions AG, Pfäffikon, Pfäffikon (CH)

(72) Inventors: Julian Thiemo Kolb, Bad Kreuznach (DE); Marco Siegler, Bingen am Rhein (DE); André Blümel, Bechtolsheim (DE)

(73) Assignee: Oerlikon Surface Solutions AG, Pfäffikon, Pfäffikon (CH)

( * ) Notice: Subject to any disclaimer, the term of this patent is extended or adjusted under 35 U.S.C. 154(b) by 11 days.

(21) Appl. No.: 18/283,098

(22) PCT Filed: Mar. 24, 2022

(86) PCT No.: PCT/EP2022/057827
§ 371 (c)(1),
(2) Date: Sep. 20, 2023

(87) PCT Pub. No.: WO2022/200527
PCT Pub. Date: Sep. 29, 2022

(65) Prior Publication Data
US 2024/0169169 A1    May 23, 2024

(30) Foreign Application Priority Data
Mar. 24, 2021 (DE) ..................... 10 2021 001 523.1

(51) Int. Cl.
*G06K 7/10* (2006.01)
*G06K 7/14* (2006.01)
(52) U.S. Cl.
CPC ..... *G06K 7/10722* (2013.01); *G06K 7/10861* (2013.01); *G06K 7/1417* (2013.01)

(58) Field of Classification Search
CPC .......... G06K 7/10722; G06K 7/10861; G06K 7/1417
USPC ..................................................... 235/462.41
See application file for complete search history.

(56) References Cited

U.S. PATENT DOCUMENTS

| | | | |
|---|---|---|---|
| 9,569,938 B1* | 2/2017 | Lampe | G07G 1/0018 |
| 2010/0294840 A1 | 11/2010 | Barry | |
| 2011/0315261 A1* | 12/2011 | Coleman | E21B 17/006 |
| | | | 138/104 |

(Continued)

FOREIGN PATENT DOCUMENTS

| DE | 19848080 A1 | 4/2000 |
|---|---|---|
| DE | 112016004847 T5 | 6/2018 |

*Primary Examiner* — Allyson N Trail
(74) *Attorney, Agent, or Firm* — Bret E. Field; Bozicevic, Field & Francis LLP

(57) ABSTRACT

The present invention relates to a device (1) for scanning a DMC and/or a barcode on the shaft of a tool, comprising:
  a scan camera (3),
  a housing (5) on which the scan camera is arranged and aligned in such a way that it can scan an area inside the housing, the alignment of the scan camera (3) defining a scanning direction from the scan camera (3) to the tool shaft to be scanned and the area defining a scanning area,
  wherein the housing (5) has an opening (7) on a wall substantially parallel to the scanning direction, such that the shaft of the tool provided with a DMC and/or barcode can be inserted perpendicular to the scanning direction into the scanning area for scanning.

20 Claims, 3 Drawing Sheets

(56) References Cited

U.S. PATENT DOCUMENTS

| | | | | |
|---|---|---|---|---|
| 2014/0374156 A1* | 12/2014 | Griffo | ............... | E21B 10/55 |
| | | | | 175/17 |
| 2015/0363710 A1* | 12/2015 | Meier | ............... | G06Q 10/06 |
| | | | | 235/376 |
| 2020/0210768 A1* | 7/2020 | Turkelson | ............ | G06T 7/0002 |

* cited by examiner

DEVICE FOR SCANNING DATA MATRIX CODES

The present invention relates to a device for scanning Data Matrix Codes (DMC) and a surface treatment method using such a device.

Metal or metal alloy components often need to undergo surface treatment. This is the case, for example, with tools and in particular with tools with a cylindrical shaft. Prominent and widespread representatives here are shaft tools, especially drills.

Drills, for example, can be reground after use. For this purpose, however, their surface should first be cleaned. After regrinding, they can then be cleaned again and preferably also coated with a hard material layer.

Different shaft tools usually require different treatments. If these steps/stages are to be carried out on an industrial scale, the problem arises in most cases that the number of tools for which the individual customer orders a treatment service is too small to meaningfully fill cleaning and/or coating holders, for example. This makes cleaning inefficient. One would therefore want to combine different orders from different customers for cleaning. However, if one does this, the problem arises after cleaning that the individual orders have to be separated from each other again. Without further help, this is a difficult, time-consuming and thus inefficient undertaking.

Sometimes it also happens that a tool gets lost within the different treatment steps/stages and is only found again later. These two problems can be addressed by marking the individual tools with a code specific to them.

Another possibility is direct engraving of marker codes on the shaft of the tools. On the one hand, these can be the well-known barcodes, but on the other hand, a so-called Data Matrix Code (DMC) is also suitable. The present invention provides a solution for both the barcode approach and the DMC approach. Since the solution is identical for both approaches, the invention is described below mainly for the DMC approach.

A Data Matrix Code can be understood in particular as a two-dimensional data point pattern that has a variable, rectangular size in the form of a matrix. The matrix can comprise at least 10×10 and at most 144×144 symbol elements. It can be a binary code, for example, which is interpreted with zeros and ones and can comprise up to 1,556 bytes.

Here, a horizontal and a vertical edge can describe a corner that serves as orientation for reading—the so-called "Finding Pattern". On the opposite sides, the respective side can preferably vary between light and dark square elements to describe the position and size of the matrix structure—the "Alternating Pattern". The data storage area is here advantageously located within the symbol.

This machine-readable coding form was developed to enable larger amounts of data than with 1D codes to be arranged in a smaller space. Camera scanners can already reliably read dot patterns as small as 2×2 mm. This makes DMC suitable for very small products or curved surfaces where there is little space for markings on the product.

DMC technology makes it possible to attach a one-to-one systematic marking to the tool, which makes it possible to permanently assign a lot of information stored in a database, such as article or batch numbers, manufacturing or expiry dates and other important production data to the workpiece across all method steps/stages. The DMCs can therefore be used as one-to-one numbers that are assigned to all the information in a database.

A particular advantage is also that the code can be applied directly—without a label—to an object using various printing or embossing processes. It can be pinned, lasered, or printed using inkjet or thermal transfer printing. And it works on a wide variety of materials: plastic, paper, metal and more. Since special cameras must be used to read the DMC, they can be read in any position.

In addition, the error correction when reading a DMC is very high due to information redundancy and error correction algorithm: even a pollution or damage of the data field by 25-30% can be fully compensated.

However, the position of the DMC disadvantageously determines whether it can be read or not. This is because, unlike RFID, a DMC can only be read with visual contact.

A concealed DMC cannot be read by cameras. And even if there is visual contact, the DMC can only be read within a certain reading distance.

In addition, although a DMC allows low-contrast printing (20% contrast is sufficient), glossy surfaces are difficult to handle because either the light used by the camera for readout is not optimally reflected or is scattered too much. In addition, the angle at which the camera is mounted can also play a role.

(see https://www.innovating-automation.blog/dmc-vs-rfid/?lang=de)

Since shaft tools (such as drills)—as already described above—are in most cases produced from metal or an alloy, they either have a shiny surface or the surface is roughened in such a way that—as also described above—the light used by the camera for readout is not optimally reflected or is strongly scattered. Accordingly, reading out the DMC on such substrates usually causes problems. In particular, the rounded and usually highly polished surfaces create light bands above the DMC, which make reading out difficult or impossible, especially under uncontrolled lighting conditions.

It is therefore the object of the present invention to at least partially overcome the above-mentioned disadvantages of known devices and systems for scanning Data Matrix Codes. In particular, it is the object of the present invention to provide a simple and cost-effective solution that allows reliable reading of DMCs on metallic surfaces, in particular of shaft tools.

The foregoing problem is solved by a device having the features of the independent device claim and a method having the features of the independent method claim. Further features and details of the invention result from the respective dependent claims, the description and the drawings. Features and details which are described in connection with the device according to the invention naturally also apply in connection with the method according to the invention and vice versa in each case, so that with regard to the disclosure concerning the individual aspects of the invention reference is or can always be made mutually.

According to the invention, a device for scanning a DMC and/or a barcode on the shaft of a tool is provided. The device comprises a scanning camera, a housing on which the scanning camera is arranged and aligned in such a way that it can scan an area inside the housing, wherein a scanning direction from the scanning camera to a tool shaft to be scanned can be defined, in particular defined by the alignment of the scanning camera, and a scanning area can be defined, in particular defined by the area. According to the invention, the housing has an opening on a wall that runs essentially parallel to the scanning direction, which opening is such that the shaft of the tool provided with a DMC and/or barcode can be inserted perpendicular to the scanning direction into the scanning area for scanning.

According to the invention, it has been recognized that through a housing, interfering influences of non-relevant light can be minimized in a specific way. In particular, this can be extraneous light, non-polarized light and stray light.

To their astonishment, the inventors have found that the elimination of (especially unpolarized) ambient light contributes very significantly to the ability to read the Data Matrix Code correctly and in a reliable manner. With the help of pure polarized light, a camera can also identify low-contrast codes with different surface characteristics. Polarized light reveals not only differences in contrast, but also differences in surface texture (e.g. roughness) particularly well.

In the context of the invention, scanning can be understood to mean in particular the acquisition of data that is preferably encoded in the form of a Data Matrix Code or a barcode. According to the invention, a scan camera can be understood here in particular as a detection element for detecting this information, which is preferably encoded in the form of a Data Matrix Code or a barcode. An arrangement and alignment of a scan camera on a housing, which ensures that the scan camera can scan an area inside the housing, can be ensured, for example, by fixing the scan camera to the housing, in which the components of the scan camera required for scanning are directed towards the inside of the housing. In addition to a fixed non-detachable fixation of the scan camera to the housing, the scan camera can also be detachably fixed to the housing and have, for example, adjustment elements for an exact alignment or adjustment. According to the invention, a scan direction is preferably understood as the direction in which the components of the scan camera required for scanning are directed in order to detect the Data Matrix Code or barcode to be scanned. Accordingly, a scanning area can in particular be understood as the area that can be captured by the scan camera. A substantially parallel course can be understood, for example, as a course that also deviates marginally, for example by 5°, preferably by less than 3°, in particular by less than 1°, from a perfectly parallel alignment.

The housing according to the invention can advantageously fulfill several objects, in particular the following object, and be configured accordingly for this purpose:
hold the scan camera or scan head,
darken the scan area,
simplify the positioning of the tool in the reading range of the scanner,
provide a way to trigger the scan,
place the tool in the optimal focus point.

The opening of the housing to insert the tool can preferably be located in the lower front area of the housing. In particular, the opening may allow the tool to be accurately positioned and aligned in the reading area of the scanner.

In particular, the housing can ensure that scattered light from the environment cannot penetrate the detector of the scanner. This minimizes disturbances in particular.

Preferably, the opening in the housing to insert the tool may be only large enough and deep enough so that the DMC attached to the tool, once inserted into the housing, is substantially automatically positioned precisely within the read and focus range of the scanner and can be read quickly and effectively.

Within the scope of a simple fixation as well as the possibility of ensuring an optimal alignment of a scan camera with respect to a scan area or with respect to an object to be scanned, it can be advantageously provided according to the invention that the housing has fixing elements and/or adjustment elements for fixing and/or adjusting the scan camera. The fixing elements can preferably produce a form- or force-fitting connection and be configured, for example, in the form of screw or clamp connections.

Alternatively, fixing via magnetic fixing elements is also conceivable. Furthermore, the adjustment elements provided here can in particular enable translation of the scan camera in the x-, y- and z-directions and optionally also rotation about an axis of rotation.

In order to avoid the entry of disturbing light, in particular stray light, into the scan area, it can preferably be provided in accordance with the invention that the housing has darkening elements for darkening the scan area, the darkening elements preferably being in the form of darkening plates for shielding light. The darkening plates can be arranged in particular perpendicular to the housing wall having the opening and contribute to defining a sharply defined scanning area in a closed housing.

To further minimize the entry of interfering light, it may further be advantageous if an opening boundary element for limiting the opening is arranged above the opening, the opening boundary element preferably being in the form of a flexible material and comprising a slot for insertion of a shaft of a tool, the flexible material in particular being formed and the slot being arranged within the opening boundary element such that the flexible material at least partially encloses the shaft upon insertion of the shaft and thus minimizes the size of the opening.

With regard to a constructively simple and cost-effective way to ensure a fast correct alignment of a tool shaft within a scan area, it may advantageously be provided that the opening is configured in such a way that the shaft, when inserted into the scan area, abuts against a boundary of the opening which prevents a movement of the shaft further in the upstream direction towards the camera. In this context, upstream can be understood in particular as a movement of the part of a shaft arranged within the housing in the direction of the scan camera, which would lead to a deviation of a perpendicular alignment of the shaft to the scan direction and would therefore reduce the scan quality.

Advantageously, the described opening of the housing can be formed in a V-shape extending upwards. Opposite the V-shaped opening, the housing can be provided with a likewise V-shaped recess. In this way, the shaft tool with cylindrical shaft can be placed against the V-shapes, whereby the shaft is automatically centered and a part of the surface of the shaft automatically comes to lie in the reading area of the scanner. According to this embodiment, the user then only has to ensure that the DMC is facing upwards.

In order not to have to adjust the angle $\alpha$ of the V-shape for any given radius, the upper area of the V can be flattened. This makes it possible in particular (of course only within the maximum reading range) to perfectly align a wide range of radii with one opening. If the range is not sufficient, both the angle $\alpha$ can be redetermined according to the formula $\alpha=\arcsin(r/(x+r))$ and the distance x (distance tool to reader).

In the context of the most exact possible timing for carrying out a scanning process, it can also be provided that elements for triggering the scanning process are provided in the scanning area, with the elements preferably being configured in such a way that the scanning process is triggered when the shaft is inserted into the scanning area. Advantageously, the elements for triggering the scanning process can be configured in such a way that a scanning process is only triggered when the shaft is fully inserted into the scanning area and a reliable acquisition of the information is ensured by the scanning process.

In the context of a particularly reliable and automatable possibility of a detection of an insertion of a shaft within an objective opening, the elements can advantageously comprise a light barrier and the scanning process can be triggered by interrupting the light beam of the light barrier.

In order to enable a particularly reliable detection of information through a scan camera, it can be advantageously provided that a polarization filter is provided for filtering unpolarized light, whereby the polarization filter is preferably arranged between the scan camera and the opening within the housing, in particular directly above the opening. Within the scope of the invention, it has been recognized in this context that non-polarized light in particular impedes reliable recognition of a Data Matrix Code or a barcode.

In order to ensure optimum alignment of the tool to be scanned within the opening, it can advantageously be provided that a positioning element is provided for positioning a tool within the opening, the positioning element preferably being in the form of a recess for at least partial insertion of the tool, the recess being arranged in particular in the wall of the housing arranged opposite the opening.

It is also an object of the invention to provide a method for surface treatment, in particular of a plurality of substrates. In this case, the method comprises the steps/stages of marking each substrate to be treated belonging to a first quantity with a DMC and/or a barcode, marking each substrate to be treated belonging to a second quantity with a DMC and/or a barcode, none of the markings of the substrates from the second quantity corresponding to a marking of the substrates from the first quantity, loading a holder for substrates with substrates of the first quantity and substrates of the second quantity, carrying out a common surface treatment of the substrates in the holder, and sorting the surface-treated substrates according to substrates of the first quantity and substrates of the second quantity, the sorting being carried out through scanning the DMC and/or barcodes in a device described above.

In the context of a simple and fast exchange of information, it is also conceivable that a cloud-based exchange of data is provided, whereby preferably the data encoded via DMC is first loaded into a cloud by the customer before the data can subsequently be retrieved from the cloud by the manufacturer via scanning of the DMC.

With regard to the exchange of useful information, it can advantageously be provided that, in addition to an indication of a customer address, at least the order to be carried out by the manufacturer is encoded in the DMCs.

Similarly, in terms of sharing meaningful information, it can be beneficial to have vendor-side data on the progress of the order as well as tracking data shared with a customer on a cloud basis.

In the context of a fast and reliably controllable sorting of different substrates, it can be further provided that substrates of the first quantity are collected in each case after the marking in a first assigned container, which is marked with a further DMC and/or barcode, and substrates of the second quantity are collected in each case after the marking in a second assigned container, which is marked with a further DMC and/or barcode.

With regard to the most economical redistribution and transport of substrates, it can be further advantageous if first and second containers are transport containers and the sorting of the surface-treated substrates takes place into the respective assigned containers.

In the context of an advantageous use of the present method, it is further conceivable that the surface treatment comprises a surface coating, in particular comprises a PVD and/or CVD coating.

In the context of an advantageous use of the present method, it is also conceivable that the substrates are tools, in particular tools with a shaft.

Further advantages, features and details of the invention will be apparent from the following description, in which embodiments of the invention are described in detail with reference to the drawings. In this connection, the features mentioned in the claims and in the description may each be essential to the invention individually or in any combination.

Figure 3:
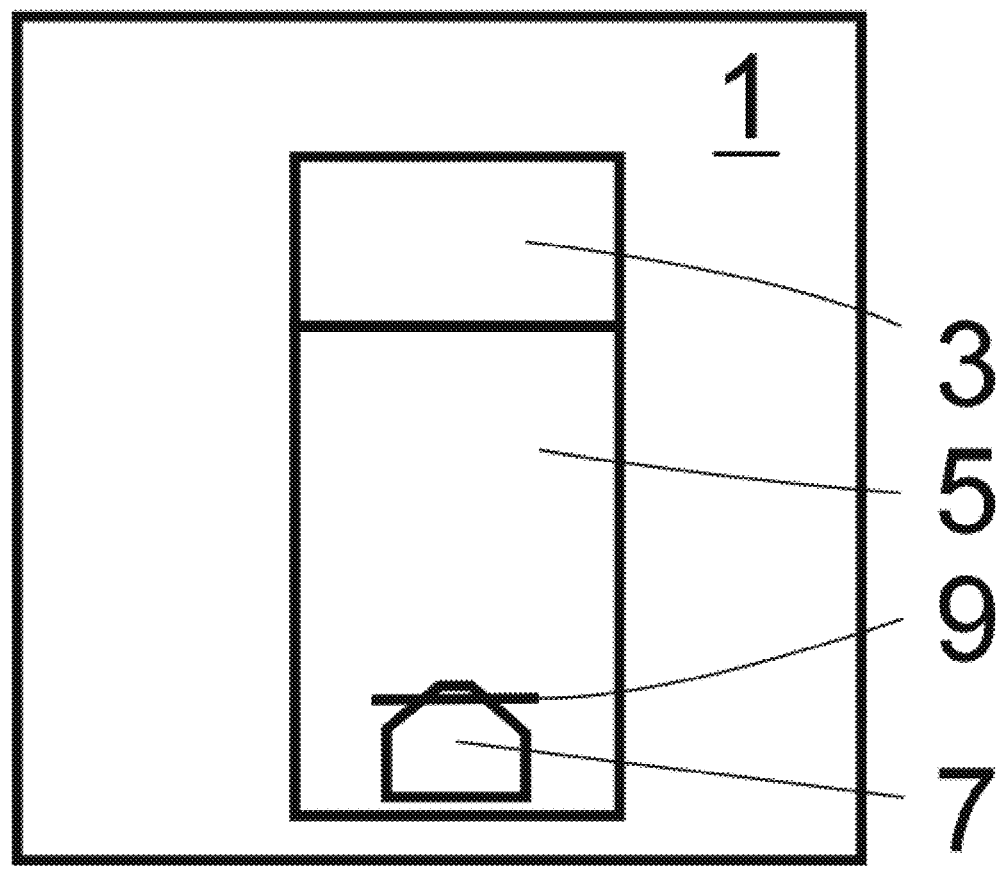
Figure 4:
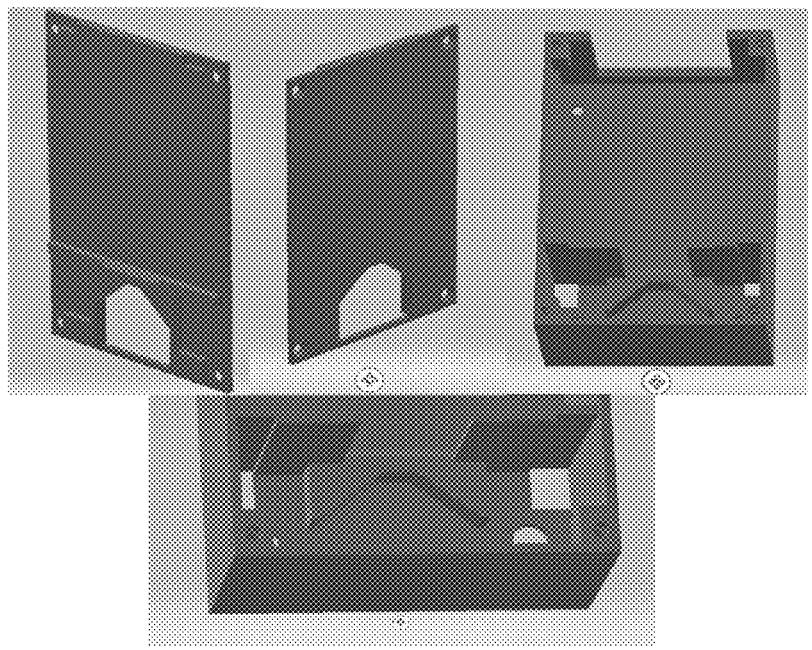
Figure 5:
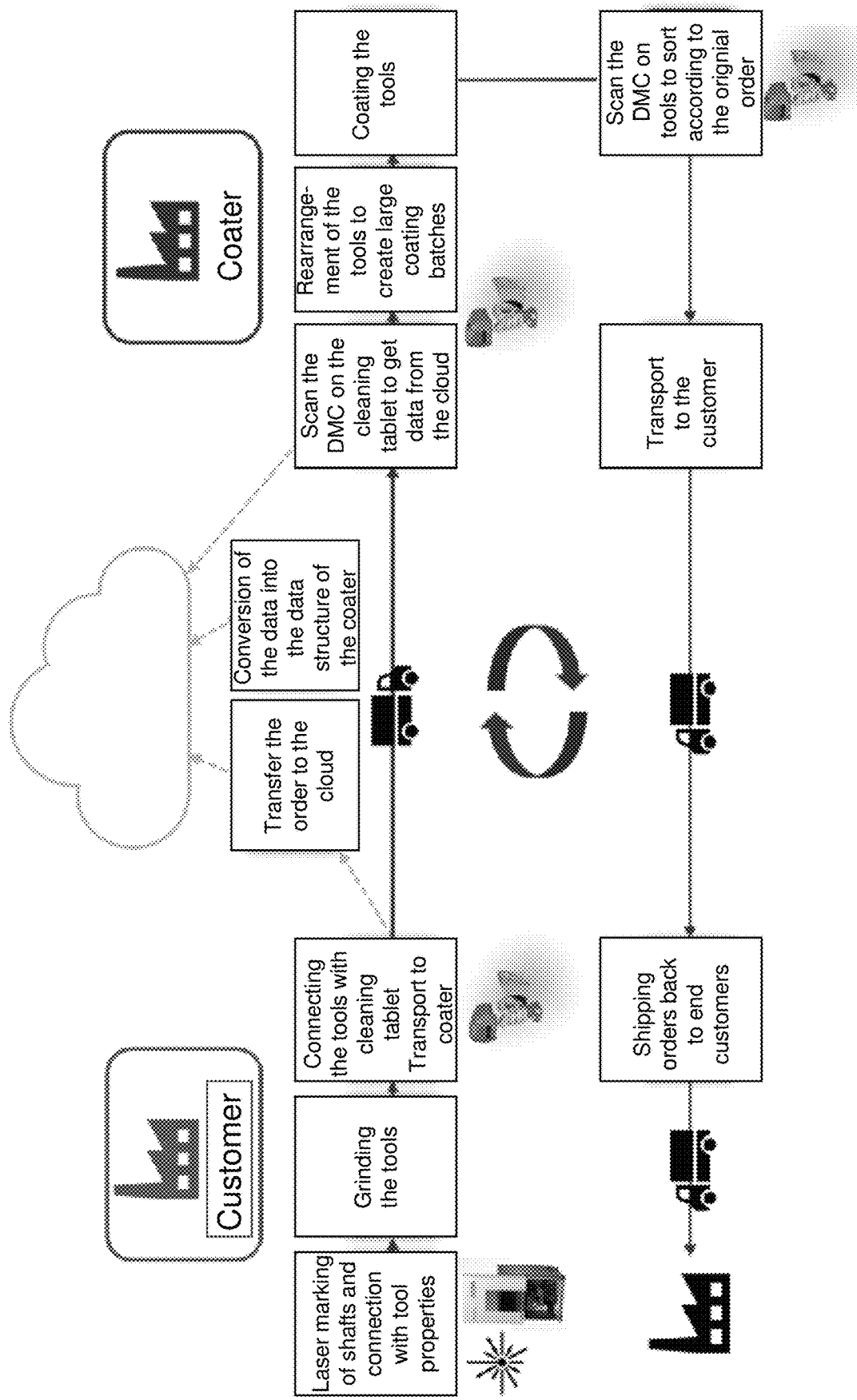

FIG. 3 schematically shows the structure of a device for scanning DMCs according to the invention, FIG. 4 shows an opened housing of a device according to the invention, FIG. 5 shows the sequence of a method for surface treatment of a variety of substrates.

Figure 1:
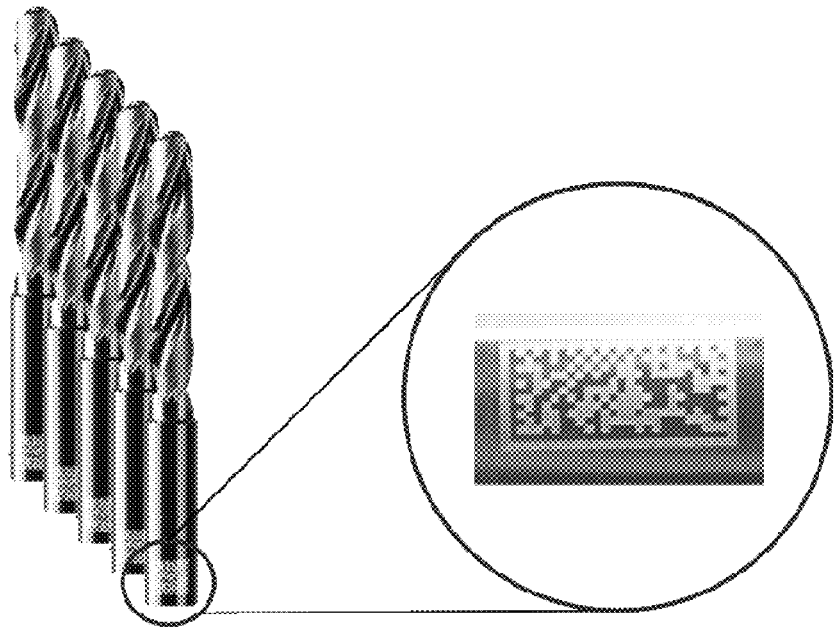
FIG. 1 shows a shaft tool (here a drill) provided with a DMC.

First, each tool is marked with a DMC specifically assigned to it through laser marking. FIG. 1 shows correspondingly marked drills. Then the tools are measured at and by the customer, e.g. the diameter of the shaft, the length and the functional diameter. The customer enters the measured data into an ERP system and assigns them to a DMC. Here, for the first time, it is necessary to identify the DMC on the shaft through a scan.

Figure 2:
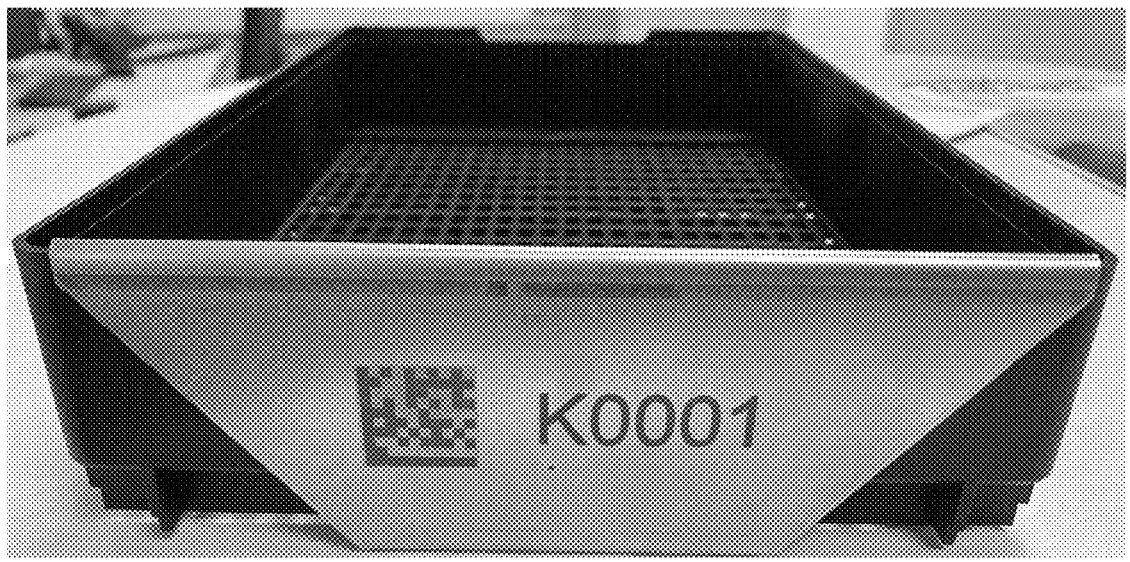
FIG. 2 shows a plastic cleaning basket which is also equipped with a DMC.

Now, for example, the regrinding of the cutting edges can take place. The tools are then transferred to a cleaning basket (which is also used as a transport device) and married to each other at the data level. FIG. 2 shows such a cleaning basket with DMC. Now the cleaning basket together with the drills can be commissioned for coating. In the example, the order together with the information about drills and DMCs is placed in a cloud. There, the data is restructured in such a way that the data set corresponds to the data structure of the coater. In parallel, the cleaning basket equipped with the drills is sent to the coater.

Once the coater receives the basket, he can scan the DMC on the basket and download the data associated with the tool set from the cloud. By rearranging and combining with other orders, possibly also from other customers, the production flow can be optimized as the fixtures to be used can be utilized to a higher degree.

At the end of the production process, the original delivery status of the customer must be restored in the outgoing goods department. For this purpose, each individual drill is scanned with the device according to the invention ("scan box") and thus identified.

FIG. 3 shows schematically the structure of the device 1 for scanning. The structure comprises a camera 3 used as a scanner, a housing 5 and an opening 7. A light barrier 9 is arranged in the housing. If this light barrier 9 is interrupted by insertion of a shaft tool, the scanning process is triggered. Disturbing light from the surroundings is largely avoided by the housing 5.

FIG. 4 shows the housing 5 again with the front panel unscrewed to allow a view of the interior. Two views of the unscrewed front wall are shown. In addition, the lower part of the open housing 5 is shown enlarged again. The housing 5 was created using 3D printing.

Once the original orders have been reassembled, the coated tools can be transported back to the customer and/or end customer.

The invention claimed is:

1. A device for scanning at least a DMC or a barcode on the shaft of a tool, comprising:
a scan camera,
a housing on which the scan camera is arranged and aligned in such a way that it can scan an area inside the housing, the alignment of the scan camera defining a scanning direction from the scan camera to the tool shaft to be scanned and the area defining a scanning area,
wherein the housing has an opening on a wall substantially parallel to the scanning direction, such that the shaft of the tool provided with at least a DMC or barcode can be inserted perpendicular to the scanning direction into the scanning area for scanning.

2. The device according to claim 1, wherein the housing has at least fixing elements or adjustment elements at least for fixing or adjusting the scan camera.

3. The device according to claim 1, wherein the housing has darkening elements for darkening a scanning area.

4. The device according to claim 1, wherein an opening boundary element for limiting the opening is arranged above the opening.

5. The Device according to claim 1, wherein a polarization filter is provided for filtering unpolarized light.

6. The device according to claim 1, wherein a positioning element is provided for positioning a tool within the opening.

7. The device according to claim 1, wherein the opening is configured such that the shaft, when inserted into the scanning area, abuts a boundary of the opening that prevents movement of the shaft further upstream toward the camera.

8. The device according to claim 1, wherein the opening of the housing is configured to extend upwards in a V-shape.

9. The device according to claim 8, wherein a region of the V-shaped opening is flattened.

10. The device according to claim 1, wherein elements for triggering the scanning process are provided in the scanning area.

11. The device according to claim 10, wherein the elements comprise a light barrier and the scanning process is triggered by interrupting the light beam of the light barrier.

12. A method for surface treatment of a plurality of substrates comprising the stages of:

Marking each substrate to be treated belonging to a first set with at least a DMC or a barcode, Marking each substrate to be treated belonging to a second set with at least a DMC or a barcode, wherein none of the markings of the substrates from the second set corresponds to a marking of the substrates from the first set, Feeding a holder for substrates with substrates of the first quantity and substrates of the second quantity, Carrying out a common surface treatment of the substrates in the holder, Sorting of the surface-treated substrates according to substrates of the first amount and substrates of the second amount, wherein the sorting is performed through scanning at least the DMCs or barcodes in a device according to claim 1.

13. The method according to claim 12, wherein a cloud-based exchange of data is provided.

14. The method according to claim 12, wherein, in addition to an indication of a customer address, at least the order to be carried out by the manufacturer is encoded in the DMCs.

15. The method according to claim 12, wherein data on the progress of the order as well as tracking data are exchanged with a customer on a cloud basis by the manufacturer.

16. The method according to claim 12, wherein substrates of the first quantity are collected in each case after marking in a first assigned container which is marked with at least a further DMC or barcode, and substrates of the second quantity are collected in each case after marking in a second assigned container which is marked with at least a further DMC or barcode.

17. The method according to claim 12, wherein first and second containers are transport containers and the sorting of the surface-treated substrates takes place into the respectively assigned containers.

18. The method according to claim 12, wherein the surface treatment comprises a surface coating.

19. The method according to claim 12, wherein the substrates are tools.

20. The device according to claim 8, wherein opposite the V-shaped opening in the housing a likewise V-shaped formation is arranged in order to center a tool within the opening.

* * * * *